United States Patent
van der Kolk

[11] 3,865,014
[45] Feb. 11, 1975

[54] PRESSURE REGULATOR
[75] Inventor: Hans-Jürgen van der Kolk, Sersheim, Germany
[73] Assignee: Robert Bosch GmbH, Stuttgart, Germany
[22] Filed: Nov. 2, 1973
[21] Appl. No.: 412,439

Related U.S. Application Data
[63] Continuation-in-part of Ser. No. 153,219, June 15, 1971, abandoned.

[30] Foreign Application Priority Data
June 27, 1970  Germany.................... 2031850

[52] U.S. Cl............................ 91/417, 91/433, 137/501
[51] Int. Cl........................ F15b 13/04, F15b 15/17
[58] Field of Search ............ 91/417, 235, 321, 433, 91/442, 468, 469; 137/117, 501, 625.6, 625.66

[56] References Cited
UNITED STATES PATENTS

| | | | |
|---|---|---|---|
| 2,644,482 | 7/1953 | McCallum | 137/501 |
| 2,974,641 | 3/1961 | Brown et al. | 91/417 X |
| 2,994,304 | 8/1961 | Shultz | 91/417 X |
| 3,164,959 | 1/1965 | Gondek | 91/420 |
| 3,230,841 | 1/1966 | York | 137/625.66 X |
| 3,370,513 | 2/1968 | Shore | 137/625.66 X |
| 3,568,718 | 3/1971 | Wilkie et al. | 137/625.6 |

Primary Examiner—Irwin C. Cohen
Attorney, Agent, or Firm—Michael S. Striker

[57] ABSTRACT

A pilot piston controls the connection between a hydraulic fluid inlet passage and an outlet passage, on the one hand, and a control passage, on the other, the control passage being connected to a servo piston that operates the control element of a hydraulic machine. The control passage has a pressure regulating valve, a compensating piston being moved in response to any pressure difference across the pressure regulating valve. A follow-up lever coupled to the pilot piston moves the latter in response to any movement of the compensating piston so as to return the pilot piston to the neutral position.

9 Claims, 1 Drawing Figure

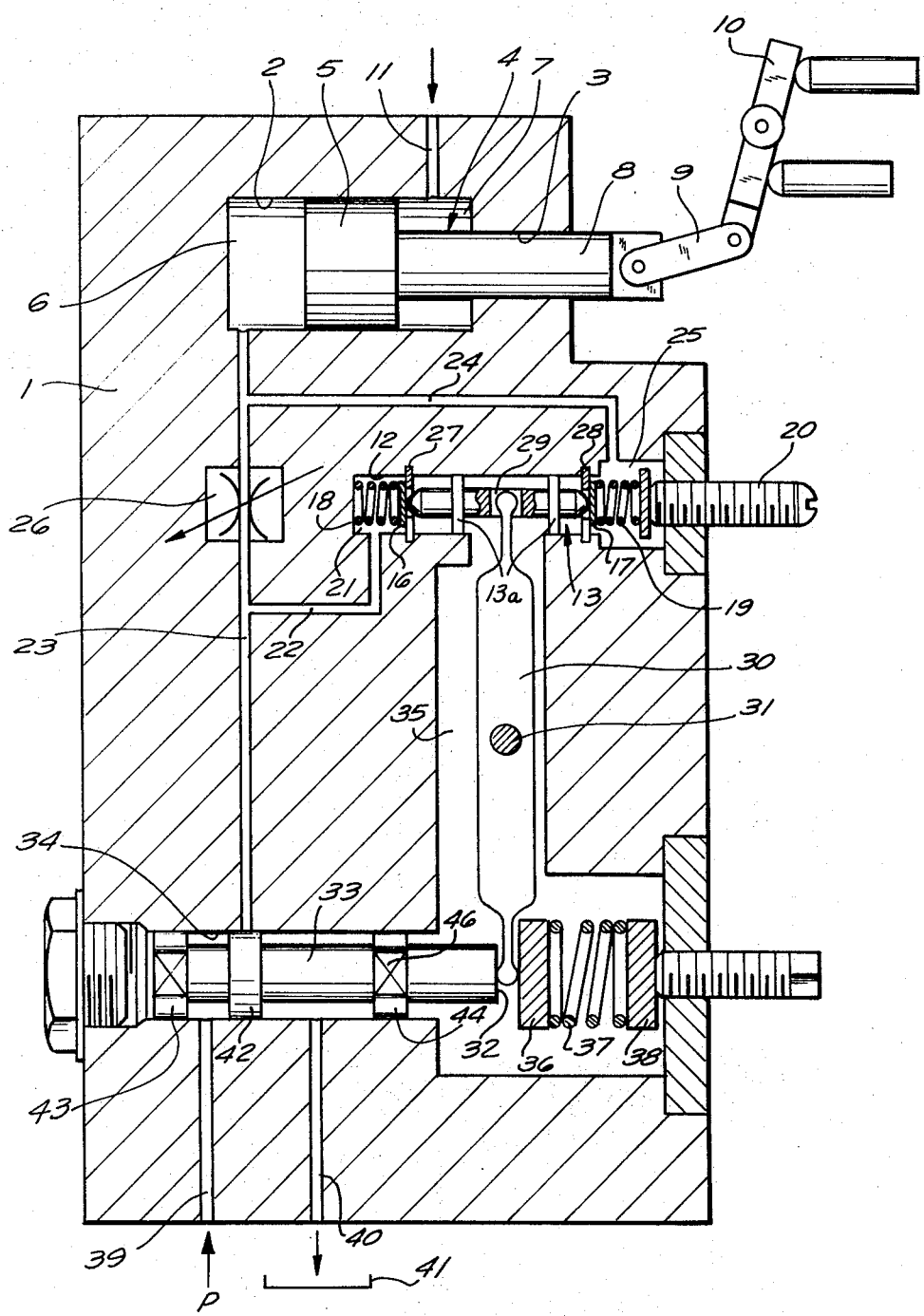

PRESSURE REGULATOR

CROSS-REFERENCE TO RELATED APPLICATION

The present application is a continuation-in-part application of the copending application Ser. No. 153,219, filed June 15, 1971 and now abandoned.

BACKGROUND OF THE INVENTION

The invention relates to a pressure regulator, particularly a pressure regulator for hydraulic machines, such as a pump or a hydraulic engine. Known pressure regulators for this purpose have a servo piston of which the position is influenced by a pilot piston that is urged to move in one direction by a control spring, and in the other direction by hydraulic fluid, which latter is conducted by a control line, controlled by the pilot piston, to a pressure chamber of the servo piston, where it urges the latter to move in one direction.

Pressure regulators of this kind have the disadvantage that when reducing the error in the pressure the connection to the servo piston is held open too long, so that the desired value may be exceeded (proportional reset controller or quasi-continuous three-term controller). Regulators of this kind are not very precise and tend to hunt, and for this reason are not suitable for all purposes.

SUMMARY OF THE INVENTION

An object of the invention is a pressure regulator or controller of the described kind that reduces deviations from the desired value to a minimum, and thereby ensures a stable control characteristic.

Briefly, the invention consists of a servo piston for controlling the position of the control element of the hydraulic machine, a control passage for conducting hydraulic fluid to act on the servo piston, a pilot piston, having a neutral position, for controlling, when moved from the neutral position, the supply of hydraulic fluid to the control passage, and the discharge of hydraulic fluid from the control passage, in dependence on the direction of movement from the neutral position, so as to control the position of the servo piston, the pilot piston being urged in one direction by the hydraulic fluid, control force means for resiliently urging the pilot piston in the other direction, a pressure chamber for the servo piston for containing hydraulic fluid to urge the servo piston in one direction, the pressure chamber being connected to the control passage, a pressure regulating valve in the control passage, a compensating piston, means for causing any pressure difference across the pressure regulating valve to act on the compensating piston to move the latter in one direction or the other, and follow-up means for moving the pilot piston in response to movement of the compensating piston so as to assist the force of the hydraulic fluid or of the control force means acting on the pilot piston, to return the latter to the neutral position, so as to avoid over travel of the servo piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a side view, partly in cross section, of the pressure regulator of the invention.

DESCRIPTION OF THE PREFERRED EMBODIMENT

With reference to the FIGURE, the housing 1 of the pressure regulator incorporates a stepped bore 2, 3 in which a servo piston in the form of a differential piston 4, 5 is free to move back and forth in a fluid-tight relationship with the bore 2, 3. The piston proper 5 separates the bore 2 into two pressure chambers 6 and 7, the piston rod 8 projecting outside of the housing 1. Fixed to the end of the piston rod 8 is a tongue 9, which is fixed to a control element 10 that, for example, can be the swivel disc of an axial reciprocating engine.

A passage 11 opens into the pressure chamber 7. There is within the passage 11 a control pressure $p$, which is produced by the reciprocating engine, if the latter operates as a pump, or which is conducted to the reciprocating engine, if the latter operates as a motor, in which event the pressure $p$ is the pressure of the system.

The housing 1 incorporates a further bore 12, which runs parallel to the stepped bore 2, 3, a compensating piston 13 having two collars 13a slidable in the bore 12 so that the piston 13 is free to move in a fluid-tight relationship within the bore. Each end of the compensating piston bears against a respective cap 16, 17, which are loaded by respective springs 18 and 19 so that the springs bias the compensating piston 13 to the neutral position shown in the drawing. One of these springs, for example, the spring 19, is held in an adjustable support 20.

The spring 18 is held in a pressure chamber 21 into which opens a passage 22. This passage is connected to a control passage 23, which leads to the pressure chamber 6 of the differential piston 4.

A further passage 24 connects the control passage 23 to a pressure chamber 25 in which the spring 19 is held. A pressure regulating valve 26, which has an adjustable cross section through which the hydraulic fluid passes, is connected in the control passage 23 between the points at which the passages 22 and 24 are respectively connected to the control passage 23.

The stroke of the compensating piston 13 is limited by radially split snap rings 27 and 28 in annular grooves in the bore 12, so that even when the caps 16 and/or 17 abut against the respective snap ring, pressure fluid may pass through the split snap ring. A slot 29 is provided approximately in the middle of the compensating piston, there extending into this slot one end of a follow-up lever 30 that is mounted free to pivot on an axle 31 that is fixed to the housing. The other end of the follow-up lever bears against the right-end face 32 of a pilot piston or pilot piston valve 33, which moves in a bore 34 in sealing relationship therewith. The follow-up lever 30 is located in a space 35 incorporated in the housing 1.

The end of the follow-up lever 30 that bears against the end face 32 of the pilot piston 33 is borne against by a cap 36, against which presses a control spring 37, the other end of which is held by an adjustable support 38.

The control passage 23 opens into the bore 34, which is connected to two passages 39 and 40 that extend to the end of the housing 1. The passage 40 leads to a space at atmospheric pressure, such as a tank 41, the other passage 39 being connected to a source of pressure medium, which is at the control pressure $p$. Thus the pressure within the passage 39 is the same as that within the passage 11.

The places at which the passages 39 and 40 open into the bore 34 are located left and right of the place where the control passage 23 opens into the bore 34. The pilot piston 33 has a collar 42, which covers the mouth of the control passage 23 in a determined position of the pilot piston.

The pilot piston 33 has two additional collars 43 and 44; each of these collars has a respective flat 45 and 46. The bore 34 opens into the space 35.

The pressure regulator operates in the following manner. If the control pressure in the passage 39 exceeds a predetermined value, the force acting on the collar 42 pushes the pilot piston to the right against the opposing force of the control spring 37.

Consequently, the collar 42 is moved to permit connection between the passage 39 and the control passage 23, and there results a pressure difference across the pressure regulating valve 26. The higher pressure is conducted through the valve 26 to the pressure chamber 6 of the differential piston 4, which latter is thereby moved to the right so as to reduce the size of the pressure chamber 7. Although the pressure within this latter chamber is the higher control pressure $p$, the left face of the piston 5 is considerably larger than the right face. Consequently, the force acting on the left face in the pressure chamber 6 is greater than that acting on the right face in the pressure chamber 7. The differential piston so adjusts the control element 10 that the stroke of the hydraulic engine (which is assumed to be operating as a pump) is reduced, thereby lowering the control pressure $p$. With falling pressure, the control spring 37 is now able to push the pilot piston 33 to the left.

The pressure difference across the pressure regulating valve 26 acts on the compensating piston 13, which is moved to the right against the force of the spring 19, thereby pivoting the follow-up lever 30 in a clockwise direction. The follow-up lever thus pushes the pilot piston to the left: in other words, in the direction in which the control spring 37 acts on the pilot piston. Thus, the pilot piston 33 is moved a trifle sooner to break the connection between the passage 39 and the control passage 23 than would be the case if the follow-up lever 30 were not present. In this way, over travel, which has always been the case, is avoided.

If the control pressure or the system pressure $p$ falls below a predetermined value, the control spring 37 pushes the pilot piston 33 to the left so as to provide a connection between the passage 40 and the pressure chamber 6. The pressure medium can now discharge from the pressure chamber 6 into the tank 41, the pressure in the pressure chamber 7 now pushing the differential piston 4 to the left. Consequently, the control element 10 is so adjusted that the stroke of the reciprocating engine is increased, thereby again raising the system pressure $p$.

Because of the pressure medium discharging from the pressure chamber 6, there is, once again, a pressure difference across the pressure regulating valve 26, this time, however, the pressure above the valve 26 being higher than that below the valve. The force acting on the compensating piston 13, which force is proportional to this pressure difference, moves the piston 13 to the left, the follow-up lever 30 being pivoted counterclockwise. Consequently, the bias of the control spring 37 is partly neutralized, and the pilot piston 33 is caused to take the neutral position slightly earlier, thereby avoiding over travel.

The set point of the pressure regulator is controlled by the adjustable spring support 38. The force with which the follow-up lever 30 moves the pilot piston 33 is controlled by the adjustable spring support 20.

By employing a compensating piston that is moved by the pressure difference across a pressure regulating valve to control a follow-up lever, which acts on a control spring, there is obtained a pressure regulator of very high precision, a three-term controller with regulating speed proportional feedback. This feedback enables the pressure regulator to compensate for time lags in the controlled system.

The two springs 18 and 19 with adjustable bias acting in opposed directions on the compensating piston 13 ensure a very versatile pressure regulator.

It will be understood that each of the elements described above, or two or more together, may also find a useful application in other types of constructions differing from the types described above.

While the invention has been illustrated and described as embodied in an improved pressure regulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A hydraulic pressure regulator for an adjustable hydraulic machine comprising, in combination, a cylinder, a differential piston axially movable in said cylinder and defining in the latter a pair of pressure chambers to opposite sides of said differential piston; a control element for the hydraulic machine; means connecting said control element with said differential piston for controlling the position of said control element depending on the position of said piston in said cylinder; means for constantly applying hydraulic fluid at a control pressure to one of said pressure chambers; a control passage connected to the other pressure chamber; a pilot piston valve having a neutral position for controlling, when moved from said neutral position, the supply of hydraulic fluid to said control passage and the discharge of hydraulic fluid from said control passage, in dependence on the direction of movement of said pilot piston valve from said neutral position so as to feed hydraulic fluid into said other pressure chamber or to discharge hydraulic fluid therefrom; passage means for directing fluid at said control pressure against said pilot piston valve for urging the latter in one direction; resilient control force means for urging said pilot piston valve in the other direction; a pressure regulating valve in said control passage; a compensating piston; means for causing any pressure difference across said pressure regulating valve to act on said compensating piston to move the latter in one direction or the other from a neutral position; and mechanical follow-up means in engagement with said pilot piston valve and said compensating piston for moving said pilot piston valve in response to movement of said compensating piston so as to assist the force of the hydraulic fluid or of said control force means acting on said pilot piston valve to return the latter to said neutral position, so as to avoid over-travel of said differential piston.

2. The pressure regulator as defined in claim 1, wherein said differential piston has on one side a large pressure face facing one of said pressure chambers and on the other side a small pressure face facing the other pressure chamber, said means for applying hydraulic fluid at said control pressure communicating with said other pressure chamber and said control passage communicating with said one pressure chamber.

3. The pressure regulator as defined in claim 1, wherein said follow-up means is a lever; and pivot means for mounting said lever free to rotate about a stationary axis.

4. The pressure regulator as defined in claim 3, wherein said axis is located between the points of engagement with said pilot piston valve and said compensating piston.

5. The pressure regulator as defined in claim 1, wherein said pressure regulating valve is an adjustable valve having an adjustable cross section through which the hydraulic fluid can pass.

6. The pressure regulator as defined in claim 1, wherein said resilient control force means is a spring.

7. The pressure regulator as defined in claim 6, further including means for adjusting the force of said spring.

8. The pressure regulator as defined in claim 1, further including a pair of resilient means for biasing said compensating piston in opposed directions to said neutral position.

9. The pressure regulator as defined in claim 8, wherein the bias of one of said pair of resilient means is adjustable.

* * * * *